United States Patent
Wang et al.

(10) Patent No.: US 11,254,859 B2
(45) Date of Patent: Feb. 22, 2022

(54) INJECTION METHOD FOR SOLID RETARDED ACID

(71) Applicant: SOUTHWEST PETROLEUM UNIVERSITY, Chengdu (CN)

(72) Inventors: Shibin Wang, Chengdu (CN); Peng Shi, Chengdu (CN); Fuhu Chen, Chengdu (CN); Zhi Wang, Chengdu (CN); Yongchun Zhang, Chengdu (CN); Binwei Xu, Chengdu (CN); Shenyan Gou, Chengdu (CN); Feng Zhao, Chengdu (CN); Jianchun Guo, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/936,116

(22) Filed: Jul. 22, 2020

(65) Prior Publication Data
US 2021/0238473 A1    Aug. 5, 2021

(30) Foreign Application Priority Data

Feb. 3, 2020    (CN) .......................... 202010078919.8

(51) Int. Cl.
| | |
|---|---|
| E21B 43/27 | (2006.01) |
| C09K 8/70 | (2006.01) |
| C09K 8/72 | (2006.01) |
| E21B 41/02 | (2006.01) |

(52) U.S. Cl.
CPC ................ *C09K 8/725* (2013.01); *C09K 8/70* (2013.01); *E21B 43/27* (2020.05); *E21B 41/02* (2013.01)

(58) Field of Classification Search
None
See application file for complete search history.

(56) References Cited

U.S. PATENT DOCUMENTS

| | | | | |
|---|---|---|---|---|
| 10,945,953 | B1 * | 3/2021 | Moaseri | ................. A23L 33/10 |
| 2012/0302484 | A1 * | 11/2012 | Develter | .............. C11D 3/2082 |
| | | | | 510/191 |

* cited by examiner

*Primary Examiner* — Charles R Nold
(74) *Attorney, Agent, or Firm* — Muncy, Geissler, Olds & Lowe, P.C.

(57) ABSTRACT

An injection method for a solid retarded acid includes mixing a solid acidic substance with a natural polymer, extruding through an extruder to produce particles; putting the produced particles in a coating pan, and sprinkling zinc acetate powder; turning on the coating pan to rotate while irradiating with an infrared lamp; spraying a glycolic acid aqueous solution with a spray gun, and continuing to rotate to obtain the solid retarded acid; injecting non-reactive liquid and the solid retarded acid into the a sand mixing truck; after the mixture is uniformly mixed in the sand mixing truck, injecting the mixture into a formation by a fracturing truck; conveying the solid retarded acid to a designated location, then stopping a pump, removing pipelines, and opening the well for gushing. The method is good in drag reduction, easy for flowback, thereby reducing the construction cost and facilitating environmental protection, and has broad application.

3 Claims, 1 Drawing Sheet

INJECTION METHOD FOR SOLID RETARDED ACID

TECHNICAL FIELD

The present invention relates to an injection method for a solid retarded acid in the field of oilfield development and transformation for increasing production.

BACKGROUND

In the acidified transformation, acid-etched fractures that need to be transformed are relatively long for different types of carbonate reservoirs, which places high requirements on reducing an acid-rock reaction speed. The conventional method to reduce the acid-rock reaction is to use high-viscosity acid fluid and a network structure formed by a polymer compound to retard the time for the acid fluid to transfer to the rock surface, thereby satisfying the requirements of making long fractures. In order for the acid fluid to reach a formation and react with the formation, it is necessary to use an injection method to inject a retarded acid from the ground surface to a target formation through a shaft.

The conventional high-viscosity retarded acid, such as gelled acid, emulsified acid, chemical retarded acid or foamed acid is pressed into the formation by ground equipment under high-pressure conditions, which will produce three problems in the construction process: 1, the friction of the acid fluid in the shaft and the formation is relatively large owing to high viscosity of the high-viscosity retarded acid, resulting in high construction pressure and low displacement when the acid fluid is injected into the formation, while the construction cost is relatively high and the safety is relatively low; 2, the acid fluid will inevitably come into contact with the shaft during the injection process, resulting in corrosion of the shaft and shortening of the service life of the shaft; 3, the residual acid has a relatively high viscosity, which causes the difficulty in flowback and easily cause secondary damage to a reservoir.

In view of the emergence of solid retarded acids in recent years, in order to avoid the above problems during the injection process of the retarded acid, it is necessary to develop an injection method for a solid retarded acid, which is low in friction, free of shaft corrosion, easy for flowback, low in cost and high in safety.

SUMMARY

An object of the present invention is to provide an injection method for a solid retarded acid. By means of mixed injection of a non-reactive liquid with good drag reduction performance and a solid retarded acid with excellent retardance performance, the needs of large displacement and deep well construction on site can be met. The method is reliable in principle, simple in operation, low in liquid viscosity, good in drag reduction, and easy for flowback, thereby reducing the construction cost and facilitating environmental protection, and has broad market application prospects.

To fulfill the above technical objects, the present invention adopts the following technical solutions.

An injection method for a solid retarded acid sequentially comprises the following steps:

(1) preparation of the solid retarded acid:

uniformly mixing a solid acidic substance with a natural polymer according to a mass ratio of (0.2 to 1.2):1, and extruding through an extruder to produce particles having a particle size of 20 to 70 meshes; putting the produced particles in a coating pan, and sprinkling zinc acetate powder, wherein the mass of the zinc acetate powder accounts for 0.001 to 0.005% of the acidic substance; turning on the coating pan to rotate at a speed of 100 to 300 rpm, while irradiating with an infrared lamp; after rotating for 10 to 30 minutes, spraying a glycolic acid aqueous solution having a concentration of 92 to 98% with a spray gun, stopping spraying after 60 to 90 minutes, and continuing to rotate for 30 to 60 minutes to obtain the coated solid retarded acid.

The acidic substance is one or a mixture of two of glycolic acid and lactic acid in any ratio; the natural polymer is one or a mixture of more of guar gum, starch, carboxymethyl cellulose, hydroxypropyl carboxymethyl cellulose, and locust bean gum in any ratio.

(2) Injection construction of the solid retarded acid:

injecting non-reactive liquid with good drag reduction performance into the a sand mixing, and then adding the solid retarded acid, wherein a mass volume ratio (kg:L) of the solid retarded acid to the non-reactive liquid is (10 to 80):100; after the mixture is uniformly mixed in the sand mixing truck, injecting the mixture into a formation by a fracturing truck; conveying the solid retarded acid to a design location; then stopping a pump, removing pipelines, and opening the well for gushing after waiting for 3 to 6 hours.

The non-reactive liquid is slippery water or linear glue fracturing fluid.

Mechanism analysis of the present invention is as follows:

The acidic substance, i.e., glycolic acid (or lactic acid) of the solid retarded acid of the present invention is a strong acid, which can cause a dissolution reaction with carbonate rock and is easily granulated since it is in a solid state at normal temperature. In an anhydrous state, the glycolic acid and the natural polymer are mixed and granulated, without chemically reacting with each other. The glycolic acid is easily polymerized under the catalysis of zinc acetate. Therefore, the glycolic acid sprayed on the surfaces of glycolic acid and natural polymer particles is polymerized under a catalytic action to produce a polyglycolic acid film, which tightly coats the mixture of the glycolic acid and the natural polymer. During the acidified construction process, polyglycolic acid cannot react with the rock, and the internal acidic substance will not be released. However, the polyglycolic acid is hydrolyzed into glycolic acid after reaching a position where acidification is required. Meanwhile, the internal glycolic acid is also released to interact with the rock. During the construction process, the solid retarded acid will not react with fluid, and no additional corrosion inhibitor is needed to protect a pipe string, which greatly reduces the construction process, the construction cost and safety risks.

In view of high-displacement construction for compact carbonate reservoirs, or the construction of deep carbonate rocks, fluid needs to have low friction characteristics. In the present invention, slippery water or linear gel fracturing fluid is used to transport the solid retarded acid, which can greatly reduce the construction friction, ensure high displacement of compact carbonate rock and smooth construction of deep carbonate rock, and reduce safety risks.

Compared with the prior art, the present invention has the following beneficial effects:

(1) according to the injection method of the present invention, the fluid having low viscosity and low friction is adopted to carry the solid acid for construction, thereby saving the construction water horsepower, reducing the construction risks and ensuring a construction effect;

(2) the fluid is neutral fluid and free of any corrosion inhibitor, thereby reducing the construction process and the construction cost;

(3) the acid-rock reaction speed during acidification is effectively reduced, and acid-etched fractures are lengthened, such that long fractures may be formed to communicate more storage spaces, thereby meeting the requirements of transformation;

(4) the solid acid may be evenly laid in the fractures, which makes the non-uniform effect of etching points good, thereby achieving high conductivity after the transformation; and (6) the solid acid may be made into different particle sizes to ensure successful delivery.

DETAILED DESCRIPTION

Figure 1:
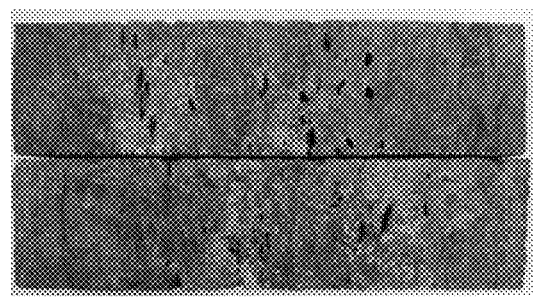
FIG. 1 is a rock slab after etching with solid acid and slippery water (1 kg solid acid: 10 L slippery water) in Example 1.

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

Example 1

An injection method for a solid retarded acid sequentially comprises the following steps:

(1) preparation of the solid retarded acid:
stirring and uniformly mixing 2 kg of solid glycolic acid with 10 kg of guar gum, and controlling an outlet dimension of an extruder to obtain 20-mesh particles; putting the particles in a coating pan and adding with 0.02 g of zinc acetate; turning on the coating pan and rotating at a speed of 100 rpm; irradiating the inside of the coating pan with an infrared lamp; after rotating for 15 minutes, spraying a 95% glycolic acid aqueous solution from an outlet of a spray gun, rotating while spraying, and stopping spraying after 60 minutes; and continuing to rotate for 40 min to obtain the coated solid acid.

(2) Injection construction of the solid retarded acid:
injecting 60 L of slippery water into a sand mixing truck, and pouring 12 kg of the prepared solid acid into the sand mixing truck, such that they are mixed; injecting the mixture into a formation, waiting for 3 h after closing the well, and then opening the well while preventing blowout, thereby completing the construction of the solid acid.

Example 2

An injection method for a solid retarded acid sequentially comprises the following steps:

(1) preparation of the solid retarded acid:
stirring and uniformly mixing 5 kg of solid lactic acid with 10 kg of starch, and controlling an outlet dimension of an extruder to obtain 40-mesh particles; putting the particles in a coating pan and adding with 0.1 g of zinc acetate; turning on the coating pan and rotating at a speed of 300 rpm; irradiating the inside of the coating pan with an infrared lamp; after rotating for 20 minutes, spraying a 96% glycolic acid aqueous solution from an outlet of a spray gun, rotating while spraying, and stopping spraying after 80 minutes; and continuing to rotate for 60 min to obtain the coated solid acid.

(2) Injection construction of the solid retarded acid:
injecting 50 L of linear glue fracturing fluid into a sand mixing truck, and pouring 10 kg of the prepared solid acid into the sand mixing truck, such that they are mixed; injecting the mixture into a formation, waiting for 4 h after closing the well, and then opening the well while preventing blowout, thereby completing the construction of the solid acid.

Example 3

An injection method for a solid retarded acid sequentially comprises the following steps:

(1) preparation of the solid retarded acid:
stirring and uniformly mixing 8 kg of solid glycolic acid with 6 kg of locust bean gum and 4 kg of hydroxypropyl carboxymethyl cellulose, and controlling an outlet dimension of an extruder to obtain 70-mesh particles; putting the particles in a coating pan and adding with 0.32 g of zinc acetate; turning on the coating pan and rotating at a speed of 200 rpm; irradiating the inside of the coating pan with an infrared lamp; after rotating for 30 minutes, spraying a 95% glycolic acid aqueous solution from an outlet of a spray gun, rotating while spraying, and stopping spraying after 90 minutes; and continuing to rotate for 30 min to obtain the coated solid acid.

(2) Injection construction of the solid retarded acid:
injecting 40 L of linear glue fracturing fluid into a sand mixing truck, and pouring 32 kg of the prepared solid acid into the sand mixing truck, such that they are mixed; injecting the mixture into a formation, waiting for 6 h after closing the well, and then opening the well while preventing blowout, thereby completing the construction of the solid acid.

Example 4

An injection method for a solid retarded acid sequentially comprises the following steps:

(1) preparation of the solid retarded acid:
stirring and uniformly mixing 12 kg of solid glycolic acid with 5 kg of carboxymethyl cellulose and 5 kg of guar gum, and controlling an outlet dimension of an extruder to obtain 50-mesh particles; putting the particles in a coating pan and adding with 0.6 g of zinc acetate; turning on the coating pan and rotating at a speed of 300 rpm; irradiating the inside of the coating pan with an infrared lamp; after rotating for 30 minutes, spraying a 98% glycolic acid aqueous solution from an outlet of a spray gun, rotating while spraying, and stopping spraying after 80 min; and continuing to rotate for 50 min to obtain the coated solid acid.

(2) Injection construction of the solid retarded acid:
injecting 105 L of slippery water into a sand mixing truck, and pouring 15 kg of the prepared solid acid into the sand mixing truck, such that they are mixed; injecting the mixture into a formation, waiting for 6 h after closing the well, and then opening the well while preventing blowout, thereby completing the construction of the solid acid.

Example 5

An injection method for a solid retarded acid sequentially comprises the following steps:
(1) preparation of the solid retarded acid:
stirring and uniformly mixing 2 kg of solid glycolic acid with 9 kg of lactic acid, 2 kg of locust bean gum and 8 kg of starch, and controlling an outlet dimension of an extruder to obtain 40-mesh particles; putting the particles in a coating pan and adding with 0.33 g of zinc acetate; turning on the coating pan and rotating at a speed of 300 rpm; irradiating the inside of the coating pan with an infrared lamp; after rotating for 30 minutes, spraying a 98% glycolic acid aqueous solution from an outlet of a spray gun, rotating while spraying, and stopping spraying after 80 min; and continuing to rotate for 50 min to obtain the coated solid acid.
(2) Injection construction of the solid retarded acid:
injecting 100 L of linear glue fracturing fluid into a sand mixing truck, and pouring 10 kg of the prepared solid acid into the sand mixing truck, such that they are mixed; injecting the mixture into a formation, waiting for 5 h after closing the well, and then opening the well while preventing blowout, thereby completing the construction of the solid acid.

Example 6

An injection method for a solid retarded acid sequentially comprises the following steps:
(1) preparation of the solid retarded acid:
stirring and uniformly mixing 6 kg of solid glycolic acid with 1 kg of lactic acid and 8 kg of locust bean gum, and controlling an outlet dimension of an extruder to obtain 40-mesh particles; putting the particles in a coating pan and adding with 0.35 g of zinc acetate; turning on the coating pan and rotating at a speed of 300 rpm; irradiating the inside of the coating pan with an infrared lamp; after rotating for 30 minutes, spraying a 98% glycolic acid aqueous solution from an outlet of a spray gun, rotating while spraying, and stopping spraying after 80 minutes; and continuing to rotate for 50 min to obtain the coated solid acid.
(2) Injection construction of the solid retarded acid:
injecting 80 L of slippery water into a sand mixing truck, and pouring 20 kg of the prepared solid acid into the sand mixing truck, such that they are mixed; injecting the mixture into the formation, waiting for 4 h after closing the well, and then opening the well while preventing blowout, thereby completing the construction of the solid acid.

Figure 2:
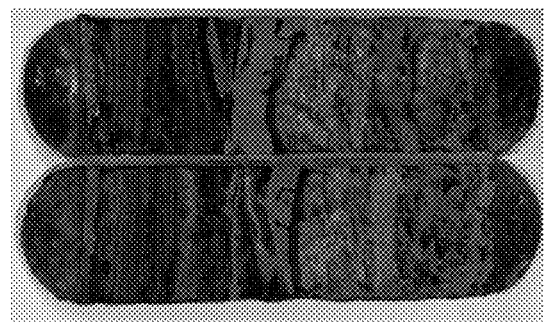
FIG. 2 is a rock slab after etching with solid acid and linear glue fracturing fluid (6 kg solid acid: 10 L linear glue) in Example 5.
Figure 3:
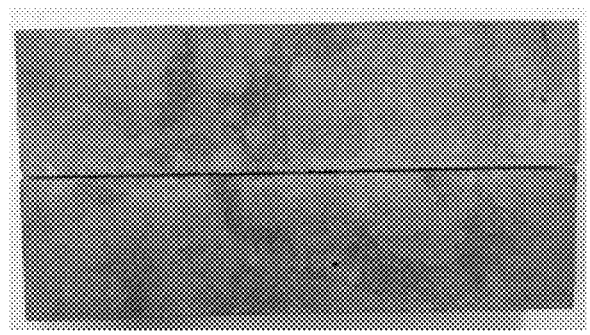
FIG. 3 is a rock slab after etching with gelled acid (formula: 0.6% gelling agent+2% corrosion inhibitor+20% HCl).

A dynamic acid etching instrument is used to test the effects of the solid retarded acids prepared in Example 1 and Example 5 and conventional gelled acid on the carbonate rock slab after etching. The results are shown in FIGS. 1, 2 and 3. The etched slabs show that the roughness of the surfaces of the etched slabs by the injection method of the present invention increases significantly.

The frictions of the fluid after mixing with the products in examples are tested according to the standard SY-T 5107-2016 "Water-based Fracturing Fluid Performance Evaluation Method". Compared with conventional gelled acid, the gelled acid has a formula: 0.6% gelling agent+2% corrosion inhibitor+20% HCl. The results are shown in the following table. As can be seen from the test results, with the delivery method of the present invention, the drag reduction rate is relatively high during the delivery process.

| No. | Fluid | Solid acid (excessively added) | Drag reduction rate (%) |
| --- | --- | --- | --- |
| 1 | Slippery water (20 L) | Example 1 (2 kg) | 77.65 |
| 2 | Linear glue (20 L) | Example 2 (4 kg) | 70.47 |
| 3 | Linear glue (20 L) | Example 3 (10 kg) | 68.21 |
| 4 | Slippery water (20 L) | Example 4 (14 kg) | 75.83 |
| 5 | Slippery water (20 L) | Example 5 (12 kg) | 76.45 |
| 6 | Linear glue (20 L) | Example 6 (16 kg) | 73.28 |
| 7 | Gelled acid (20 L) | Comparative example of gelled acid | 58.36 |

The invention claimed is:

1. An injection method for a solid retarded acid, sequentially comprising the following steps:
(1) preparation of the solid retarded acid:
uniformly mixing a solid acidic substance with a natural polymer according to a mass ratio of (0.2 to 1.2): 1, and extruding through an extruder to produce particles having a particle size of 20 to 70 meshes; putting the produced particles in a coating pan, and sprinkling zinc acetate powder, wherein a mass of the zinc acetate powder accounts for 0.001 to 0.005% of the solid acidic substance; turning on the coating pan to rotate at a speed of 100 to 300 rpm, while irradiating with an infrared lamp; after rotating for 10 to 30 minutes, spraying a glycolic acid aqueous solution having a concentration of 92 to 98% with a spray gun, stopping spraying after 60 to 90 minutes, and continuing to rotate for 30 to 60 minutes to obtain the coated solid retarded acid; and
(2) injection construction of the solid retarded acid:
injecting non-reactive liquid with good drag reduction performance into a sand mixing truck, and then adding the solid retarded acid, wherein a mass volume ratio of the solid retarded acid to the non-reactive liquid is (10 to 80): 100; after the mixture is uniformly mixed in the sand mixing truck, injecting the mixture into a formation by a fracturing truck; conveying the solid retarded acid to a designated location, then stopping a pump, removing pipelines, and opening a well for gushing after waiting for 3 to 6 hours.

2. The injection method for the solid retarded acid according to claim 1, wherein in the step (1), the acidic substance is glycolic acid, lactic acid, or any combination thereof; the natural polymer is guar gum, starch, carboxymethyl cellulose, hydroxypropyl carboxymethyl cellulose, locust bean gum, or any combination thereof.

3. The injection method for the solid retarded acid according to claim 1, wherein in the step (2), the non-reactive liquid is slippery water or linear glue fracturing fluid.

* * * * *